United States Patent [19]

Corcoran

[11] 3,735,258
[45] May 22, 1973

[54] ELECTRO-MECHANICAL DEFLECTOR FOR LIGHT BEAMS

[75] Inventor: John W. Corcoran, Los Altos, Calif.

[73] Assignee: Ampex Corporation, Redwood City, Calif.

[22] Filed: Aug. 17, 1971

[21] Appl. No.: 172,483

[52] U.S. Cl. ................................. 324/97, 324/154 R
[51] Int. Cl. ......................... G01r 13/38, G01r 1/00
[58] Field of Search .................. 324/154, 151, 97, 324/96

[56] References Cited

UNITED STATES PATENTS

| | | | |
|---|---|---|---|
| 1,981,266 | 11/1934 | Green | 324/97 |
| 2,899,641 | 8/1959 | Montgomery et al. | 324/15 X |
| 2,510,585 | 6/1950 | Kellogg | 324/154 R |
| 3,256,485 | 6/1966 | Lehner | 324/97 |

Primary Examiner—Alfred E. Smith
Attorney—Robert G. Clay

[57] ABSTRACT

A specific galvanometer structure, designed to maximize the coil/mirror inertia torsional resonance and the inductance/inertia resonance, includes a galvanometer coil and a mirror integrally bonded therewith. The coil itself acts as the mechanical beam for the mirror, and is made of many layers of anodized aluminum ribbon bonded together with epoxy. Increasing the cross-sectional width of the coil raises the coil/mirror inertia torsional resonance but lowers the inductance/inertia resonance. Accordingly, optimized operating frequency occurs when the two resonant frequencies are equal. A drive circuit coupled to the coil via a flexure-pivot coil suspending means, produces a current pulse doublet of the same form as the acceleration desired at the mirror.

5 Claims, 11 Drawing Figures

Patented May 22, 1973 3,735,258
3 Sheets-Sheet 1
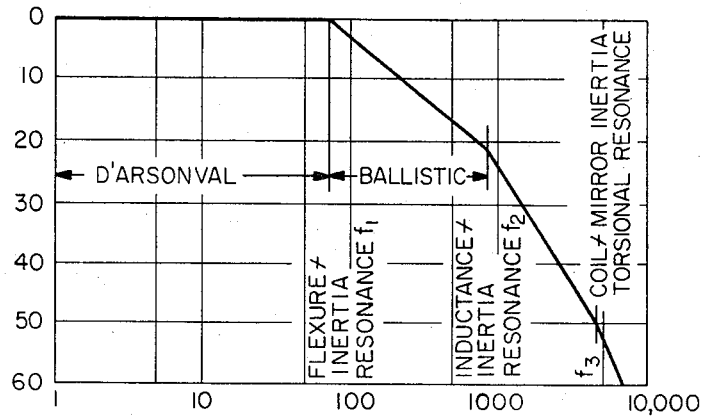
FIG_1
FIG_2
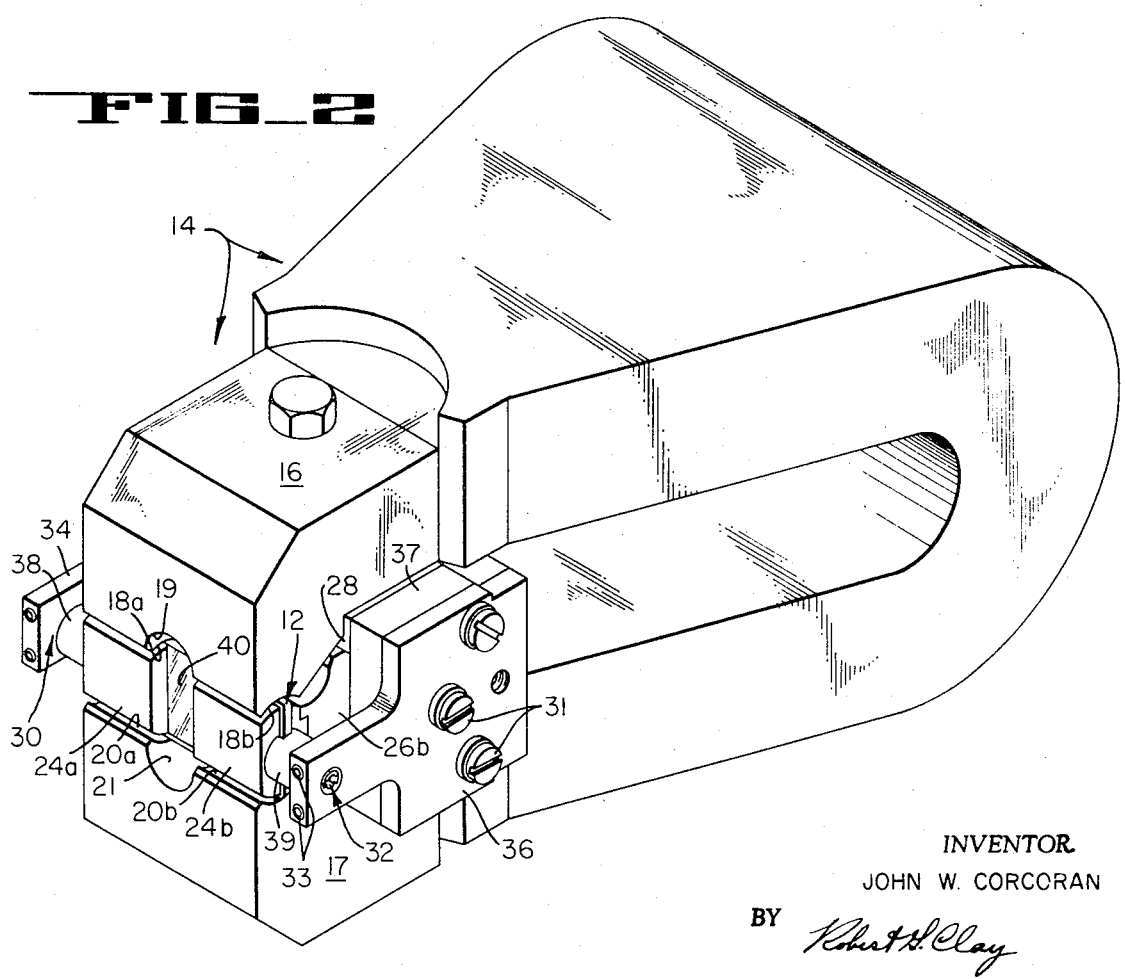
INVENTOR.
JOHN W. CORCORAN
BY Robert H. Clay
ATTORNEY Patented May 22, 1973
3,735,258
3 Sheets-Sheet 2
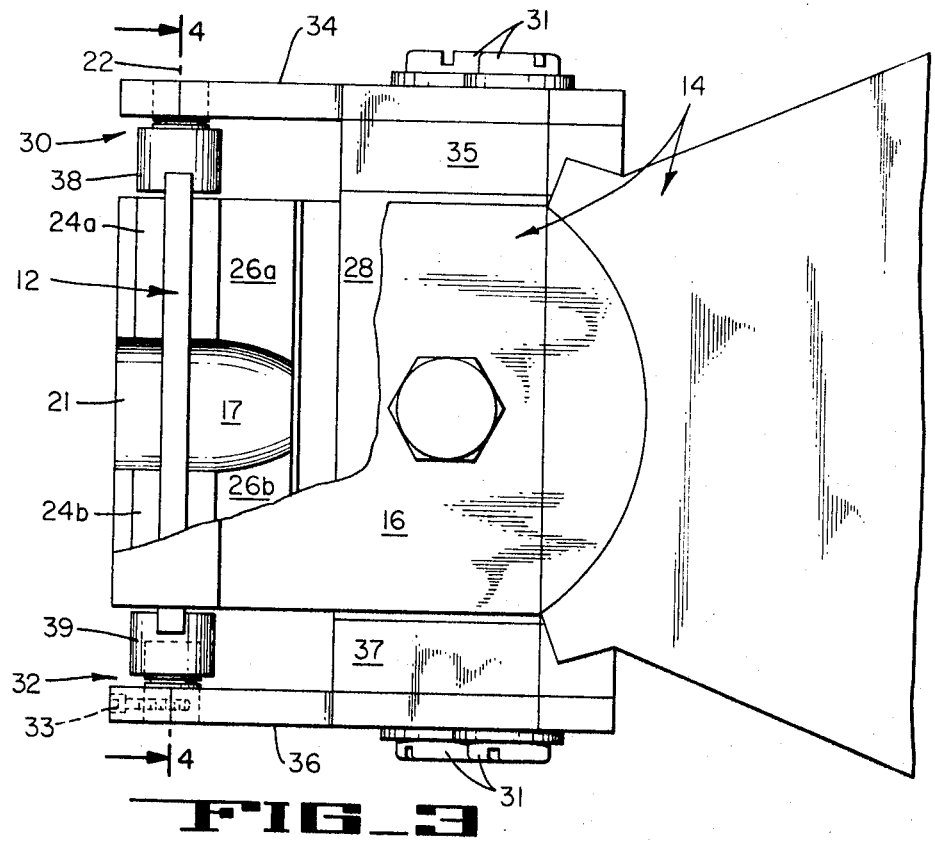
FIG_3
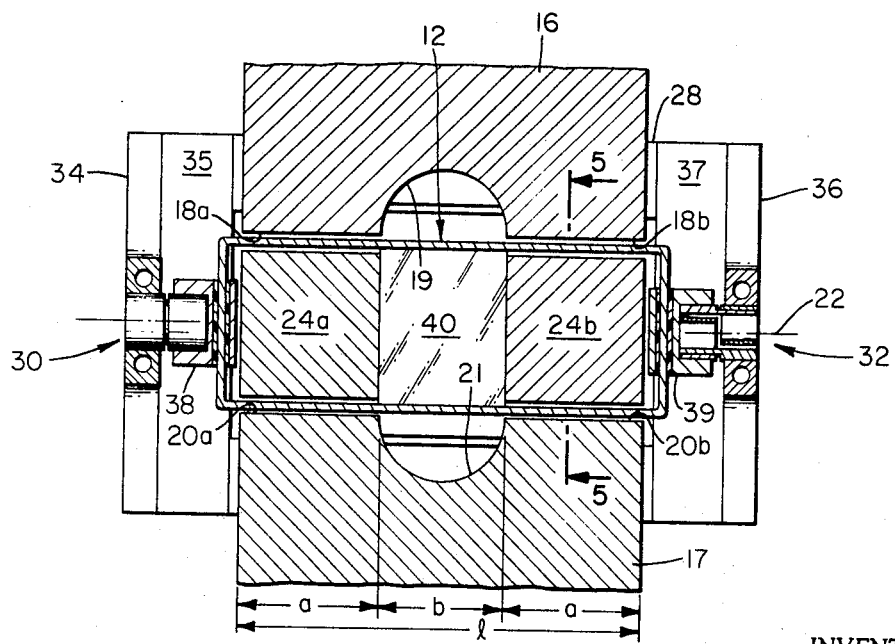
FIG_4
INVENTOR.
JOHN W. CORCORAN
BY
Robert H. Clay
ATTORNEY Patented May 22, 1973
3,735,258
3 Sheets-Sheet 3
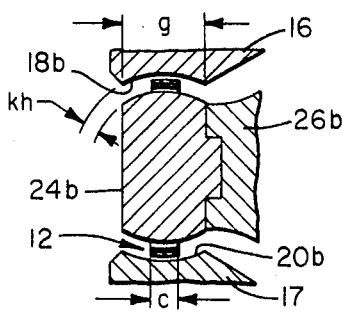
FIG_5
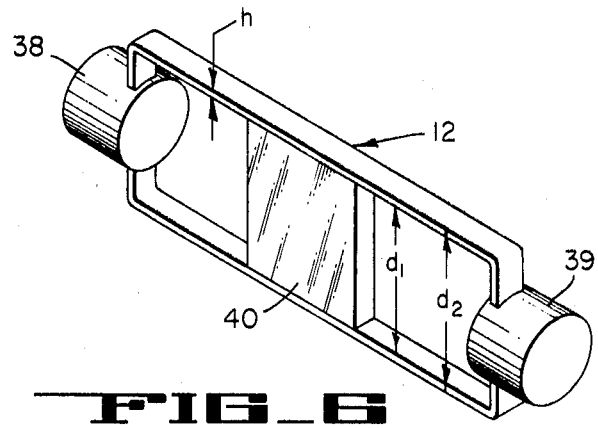
FIG_6
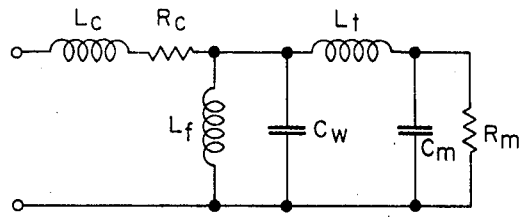
FIG_9
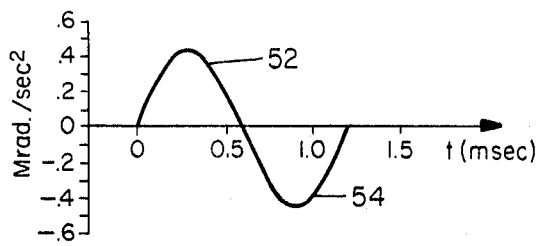
FIG_8A
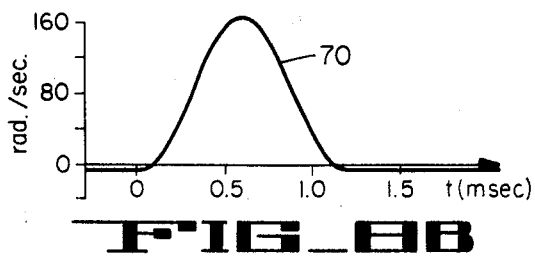
FIG_8B
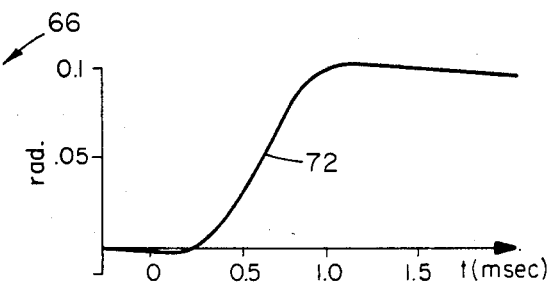
FIG_8C
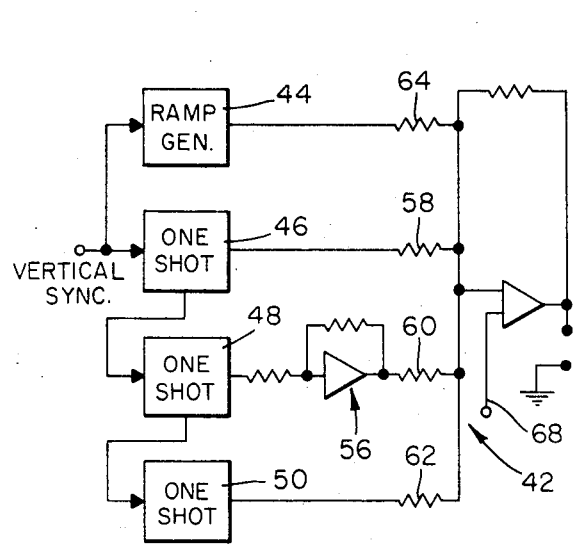
FIG_7
INVENTOR.
JOHN W. CORCORAN
BY
Robert H. Clay
ATTORNEY

ELECTRO-MECHANICAL DEFLECTOR FOR LIGHT BEAMS

The invention herein described was made in the course of a contract with the Department of the United States Air Force.

BACKGROUND OF THE INVENTION

1. Field

The invention relates to high frequency response galvanometers capable of producing deflections of laser beams at television rates with adequate resolution.

2. Prior Art

There are various galvanometers available which can provide beam deflection at a frequency response corresponding to television rates, or which provide a mirror of sufficient size to give adequate resolution during deflection of an impinging light beam. However, prior art galvanometers do not optimize both the above parameters, as is required in a television laser beam deflector. That is, prior art galvanometers which have a useful frequency response, typically employ mirror surfaces of, for example, 0.4 mm wide and 1.5 mm axial length, which are too small to give adequate resolution for the beam size requirement. In addition, prior art devices employing the D'Arsonval movement generally have the problem of a pronounced torsional resonance which causes a "ringing" at the end of each flyback cycle.

On the other hand, those prior art galvanometers which do provide a large mirror surface, do not provide the vertical fly-back interval of the order of 1.1 millisecond required in pictorial recorders of television signals. More particularly, prior art galvanometers which provide a large enough mirror for practical use in deflecting a laser beam, do not provide a combined supporting, deflecting, and driving mechanism which is capable of overcoming the inertia of the large mirror to provide deflecting speeds required in television recording systems. Thus they do not provide the basic requirement for an electromechanical deflector; to reflect a collimated beam of light through a given angular subtense and return to its starting position within a millisecond.

SUMMARY OF THE INVENTION

The present invention overcomes the shortcomings of the prior art by providing a laser beam deflector having a television rate frequency response, and a relatively large mirror having practical resolution.

A mirror of the order of, for example, one-half inch in size, is bonded to an annular galvanometer coil of generally rectangular shape. The coil acts as a mechanical beam, and is suspended within a magnetic field via opposite flexure-pivot devices. To satisfy the electrical requirements for a good conductor of many layers and the mechanical requirements of structural rigidity, the coil configuration is critical, and consists of successive wraps (40) of aluminum ribbon, anodized to provide interlayer insulation, and bonded together and to the mirror with epoxy. Increasing the width of the coil raises the coil/mirror inertia torsional resonance, but lowers the inductance/inertia resonance. The invention contemplates a coil configuration with both resonances as high as possible, whereby the maximum frequency of operation occurs when the frequencies are equal. The design logic is to force the mirror inertia (i.e., capacitive load) to follow the desired excursion. To this end, a large acceleration is imparted to the coil/mirror to initiate the flyback, and halfway through the flyback, an equal but opposite acceleration is imparted to return the sweep to the original motion.

BRIEF DESCRIPTION OF THE DRAWINGS

FIG. 1 is a graph of the system resonances for D'Arsonval and ballistic galvanometer modes for various input currents.

FIG. 2 is a perspective of an embodiment of the invention.

FIG. 3 is a partially broken-out top view of the invention of FIG. 2.

FIG. 4 is a cross-section of the deflection coil supported within the magnetic field producing magnet.

FIG. 5 is a cross-section taken along section line 5—5 of FIG. 4.

FIG. 6 is a perspective of the coil/mirror configuration of the invention.

FIG. 7 is a block diagram illustrating one embodiment of a deflector drive circuit.

FIGS. 8A, B and C are graphs showing the angular acceleration, velocity and position versus time after the vertical sync pulse for a sinusoidal force pulse.

FIG. 9 is the equivalent circuit corresponding to the basic structural concept of the invention.

DESCRIPTION OF THE PREFERRED EMBODIMENTS

The deflector configuration and operating concepts are based upon defining preferred locations of the system resonances, and then determining the structural configuration which fulfills the requirements and provides the preferred resonances. It is desirable that the resonances be made as high as possible to provide deflection at television rates, and that the input frequencies driving the galvanometer be within the bandpass of the device such that they are not absorbed. Referring to FIG. 1, there is shown the resonant points and modes of operation of two possible galvanometer movements capable of providing fast repetitive operation of a deflecting mirror; i.e., the D'Arsonval and the ballistic galvanometer modes.

In the present invention, to provide the stability and speeds of operation desired, the ballistic galvanometer mode is preferred over the D'Arsonval mode. As may be seen from FIG. 1 the upper frequency limit of the ballistic mode configuration is determined by the resonance of the coil inductance with the system inertia, or by the torsional resonance of the spring/mass system consisting of the coil acting as a beam and the inertia of the mirror section. The lowest resonant frequency, $f$, is that due to the flexure resonance with the total inertia, or in electrical form $f = 1/(2\pi \sqrt{L_f (C_w + C_m)})$ wherein $L_f$ is the flexure inductance, and $C_w$ and $C_m$ are the electrical equivalents of the remaining coil inertia and the mirror inertia, respectively. Below $f$, operation is as a D'Arsonval movement with spring deflection proportional to input current.

Accordingly as shown in FIGS. 2–5, the form of the galvanometer structure is selected to maximize the two resonances of previous mention. More particularly, the configuration of a galvanometer coil 12, i.e., its arrangement, cross-sectional dimensions, shape, etc., taken in conjunction with its structural rigidity and electrical conductivity, is selected to maximize the two resonances. As shown in FIG. 2, the galvanometer coil structure 12 is disposed within a magnetic field generated via preferably permanent magnet structure 14. The magnet structure 14 is provided with opposing pole pieces 16, 17 having opposing arcuate pole surfaces 18a, 18b and 20a, 20b respectively (FIG. 4). The pole surfaces 18a, 18b and 20a, 20b are formed via grooves 19 and 21 machined into the pole pieces 16, 17 respectively, whereby the magnetic flux is further concentrated in coil "driving regions" of the coil structure 12 configuration. The pole surfaces are contoured to allow rotation of the galvanometer coil structure 12 about a central axis 22 therethrough while maintaining a constant gap and thus distance from the coil to the confining surfaces. A pair of magnetic flux keepers 24a, 24b, formed of magnetic material, are rigidly supported within the pivotable galvanometer coil structure 12 in the driving regions thereof between the facing pole surfaces 18a, 20a and 18b, 20b, respectively. The inductance/inertia resonance depends upon the flux density of the magnetic field in which the coil 12 operates. Accordingly, to provide the highest practical value, the electromagnetically active portions of the coil 12 include the flux keepers 24a, 24b, to enhance and equalize the magnetic fields in which the coil operates. The keepers 24a, 24b are held in position within the coil structure by non-magnetic keeper supports 26a, 26b respectively, which in turn are secured to a yoke 28. The yoke is secured within the magnet structure 14.

The yoke 28 also provides support means for rotatably securing the galvanometer coil structure 12 between the pole surfaces 18a, 18b and 20a, 20b, via a pair of oppositely disposed flexure pivot means 30, 32. Respective flexure pivot supports 34, 36 are secured to the yoke 28 at either end thereof via electrical insulators 35, 37 and screws 31, etc., and extend therefrom to couple to respective flexure pivot means 30, 32 via set screws 33, to position the coil structure 12 within the magnetic field. The flexure pivots may be any of the various types available in the art such as, for example, the Bendix Free-Flex shown here by way of example, the tautband type flexure pivot, etc. The flexure pivot means 30, 32 are secured to respective end pieces 38, 39 which in turn are integrally bonded, shrinked, etc., to the opposite ends of the coil structure 12 (FIG. 6).

A mirror 40 is integrally secured within the galvanometer coil structure as further described below, whereby pivoting of the coil structure 12 provides like pivoting of the mirror 40. To this end, the mirror is centrally bonded within the driving sections of the coil to provide an integral mirror/coil unit, wherein the form of the coil structure is selected to maximize the resonances of previous mention. The symmetrical arrangement of the mirror within the coil inherently provides a higher torsional stiffness than does an asymmetrical or cantilever configuration of mirror and coil. Thus the coil itself acts as a mechanical beam in the specific configuration depicted. To satisfy the electrical requirements for a good conductor of many layers, or windings, and the mechanical requirements of structural rigidity commensurate with optimizing resonances, the coil 12 is illustrated, by way of example only, as fabricated of a continuous aluminum ribbon of selected thickness and width. Aluminum has both relatively good conductivity and a high elasticity/density ratio as required by the galvanometer configuration, however other materials such as, for example berylium, copper, titanium etc., may be utilized in place of aluminum.

The width of the coil 12 is found to be an important dimension since increasing the width raises the coil/mirror inertia torsional resonance, but lowers the inductance/inertia resonance. Since the maximum frequency of operation for the deflector occurs when the frequencies are equal, varying the width of the coil to provide a suitable value provides a compromise between the resonant frequencies; i.e., the width may be selected to provide frequencies of equal values thereby maximizing the resonances.

Referring to FIGS. 4, 5 and 6, with a coil width, $c = 3.05$ mm; a length $l = 38$ mm; an inside diameter, $d_1 = 12.7$ mm; a coil thickness, $h = 1.27$ mm; and a mirror width of 10 mm, the torsional resonance was calculated to be 5.5 KHz. This coil had 32 turns of 0.025 mm (0.001") aluminum ribbon. The interturn insulation consisted of a layer of anodize on both sides of the ribbon, and a layer of epoxy cement totaling about 0.01 mm. The number of turns N for the coil depends in large part on electrical limitations; e.g., impedance matching, etc. The coil could be for example, a single turn coil.

A drive circuit 42 for the deflector is shown in FIG. 7, and provides a current pulse doublet, triggerable from an external source and of the same form as the acceleration desired at the mirror 40 (since the torque acting on the inertia is directly proportional to the current, and the acceleration is proportional to the current). FIGS. 8A-C depict the acceleration, velocity, and deflection respectively of the deflector. The use of a doublet pulse gives a high acceleration in one direction, followed by an equal but opposite acceleration in the opposite direction, as depicted in FIG. 8A, resulting in a net displacement. Such acceleration satisfies the requirement of television scan systems which require a slow constant downward sweep timing display and a fast return during vertical flyback.

Referring to the circuit of FIG. 7, a vertical sync signal is fed to a ramp generator circuit 44, and a one-shot 46. Additional one shots 48 and 50 are sequentially coupled to one-shot 46, wherein the combination are triggered sequentially by alternate vertical sync pulses to generate a flyback current doublet pulse which, as previously mentioned, corresponds to the acceleration waveform shown in FIG. 8A. The positive portion of the doublet pulse corresponding to positive acceleration form (52 of FIG. 8A), is formed by one-shot 46, while the negative portion corresponding to the negative acceleration portion (54 of FIG. 8A), is formed by the second one-shot 48 and an inverter circuit 56 coupled thereto. The latter circuit 56 inverts the second pulse. The third one-shot 50 is employed to generate a positive pulse which provides minor correction for overshoot in the doublet pulse, i.e., prevents an exponential tail on the current waveform which degrades the scan linearity at the start of the vertical sweep. The outputs of the three one-shots are summed, together with the ramp generated by the ramp generator 44, via resistors 58-64 defining a summing junction. An output amplifier 66 is coupled to the summing junction and provides means for adjusting the amplitude of the scan through a desired angle (e.g., 11.4°). Provision is also made for centering via a D.C. bias adjustment 68 to the output amplifier 66.

The three pulse durations from the one-shots 46–50 are adjustable to give an integrated current of zero over the flyback interval, $\tau$. Thus, the integrated impulse is zero and hence the velocity after flyback at the start of a subsequent scan is identical to that at the end of the preceding scan, as required for initial and final conditions (see FIG. 8B, waveform 70). The position or deflection of the mirror 40 is depicted by waveform 72 of FIG. 8C.

The electromechanical relationships of the invention deflector were considered in terms of its equivalent electrical circuit, shown in FIG. 9. The equivalent circuit design relationship are as follows:

$$L_c = (4\pi N^2 a\, g)/(k\, h)\, Q \times 10^{-9} \tag{1}$$

$$Q = 1 - (c/2g) + (2\, kh/g\theta)\, \ln(d/kh) \tag{2}$$

$$R_c = [2\, N(d+l)]/(\sigma\, c\, e) \tag{3}$$

$$C_m = (I_m \times 10^9)/(2adBN)^2 \tag{4}$$

$$R_m = (2adBN)^2/(D \times 10^9) \tag{5}$$

$$L_f = (2adBN)^2/(K \times 10^9) \tag{6}$$

$$C_w = (I_w \times 10^9)/(2ad\, BN)^2 \tag{7}$$

$$f_1 = 1/2\pi\ \sqrt{K/(I_m + I_w)} \tag{8}$$

$$f_2 = B/2\pi c\ \sqrt{(K/\pi \rho_w PQ)\,(2a)/l\,(c/g)} \tag{9}$$

$$P = 1 + [1 - (2a/l)](\rho_m/\rho_w)\, dm/6l \tag{10}$$

$$f_3 = (2c/\pi l^2)\ \sqrt{E/\rho_w R} \tag{11}$$

$$R = [1 = (2a/l)]\,[(1/2) + (\rho_m/\rho_w)\,(d/12\, h)]\,[5 - (2a/l) - (2a/l)^2] - (ad/3l^2)\,[6 - (2a/l)^2] \tag{12}$$

wherein:
- $L_c$ is coil inductance
- $R_c$ is coil resistance
- $L_f$ is electrical equivalent of flexure spring rate
- $L_t$ is electrical equivalent of torsional spring constant for coil-mirror system
- $C_m$ is electrical equivalent of mirror inertia
- $C_w$ is electrical equivalent of remaining coil inertia
- $R_m$ is electrical equivalent of mirror windage
- $N$ is the number of coil turns
- $\theta$ is maximum deflection
- $\sigma$ is conductivity of the coil material
- $h$ is thickness of the coil
- $d$ is the mean diameter of the coil
- $I_m$ is the inertia of the mirror
- $I_w$ is the inertia of the winding
- $B$ is the gap flux density
- $D$ is viscous damping coefficient
- $P_w$ is the density of the winding
- $P_m$ is the density of the mirror
- $E$ is Young's modulus of the coil material To achieve ballistic operation the attenuating effect of the series inductances $L_c$ and $L_t$ must be small. This may be evaluated in terms of their respective resonant frequencies with the appropriate capacity. If these are greater than the frequency characteristic of the vertical flyback interval, then the attenuation will be small. A key objective of the design is to achieve this result by suitable adjustment of the design parameters. The values of the components were determined in terms of the dimensions and material properties, and, from these, the natural frequencies of the system were obtained.

The results are contained in Equations 1–12 for the geometry shown in FIGS. 5 and 6. The equations for the resonant frequencies are written in forms that emphasize the key geometrical factors with dimensionless modifying terms, K, P, Q, and R, which are all of the order of unity. The pole tip width, $g$, should be somewhat greater than $c$ to allow for fringing and coil motion but the ratio $c/g$ should be near unity. A similar argument applies to the ratio $2a/l$. Note that the diameter of the coil, which is important in the coil inertia, is only a second order factor in determining the resonances $f_2$ and $f_3$. Similarly, the number of turns in the coil drops from the resonant frequency expressions, but it remains in the electrical parameters as it is part of the mechanical-electrical impedance transformation.

The significance of the coil width, $c$, is apparent in the expressions for $f_2$ (Equation 9) the inductance-inertia resonance, and $f_3$ (Equation 11) the torsional resonance. Increasing width decreases the first and raises the second.

The deflector coil is wound with anodized aluminum foil. The foil is first prepared for winding by cleaning and anodizing. The foil is next carefully wound onto a winding form of proper shape and dimensions. During the winding process, the interlayer space is wetted with suitable epoxy cement. Afterward the coil is transferred to a curing jig. In the curing jig the curvature of the longitudinal sections of the coil is established and the mirror is added. The epoxy cement is then cured. Finally, the two ends of the winding are fixed to winding tabs at either end of the coil and thence to the end pieces 38, 39 which make the electrical connection to the flexure pivot means 30, 32 when the coil 12 is mounted. The details of the procedure are as follows:

The aluminum foil used for winding of the deflector coil is 3 mm wide by 25 micrometers thick. A length of foil of about 5 meters is required for winding one coil. This length of foil is spiral wound onto a fixture made of fiberglass base insulating material. The form of the fixture used was about 12 mm diameter by 7 mm wide. The fixture was fabricated of sheet material about 3 mm thick and contained four paddles around the circumference on which the foil was actually wound. The paddles were machined at the outer edges so as to have approximately 15 small grooves for holding the winding. The foil is wound onto the fixture with moderate tension.

A cleaning bath is prepared in which the entire fixture can be completely immersed. The bath consists of a 10 –15 percent concentration of sodium hydroxide.

The cleaning process is intended to etch the surfaces as well as to remove minute burrs left from the slitting operation. An immersion of about one minute is usually adequate to remove the luster from the surface of the foil. After etching, the fixture is removed and the foil is thoroughly rinsed in clean water.

An anodizing bath is next employed. Its depth, again, is such that the fixture may be totally immersed. The bath consists of 18 percent by weight of suphuric acid, and is maintained at a temperature of 75° F with constant agitation during the anodizing process. Two graphite plates are provided within the anodizing bath: one on either of the inner sides of the tank. The negative electrode of a power supply is connected to the two graphite plates. One end of the aluminum foil protrudes from the bath and to this the positive terminal of the power supply is attached. The anodizing current is set to be about 0.7 amperes and the anodizing process proceeds for approximately 35 minutes.

After anodizing the aluminum foil fixture is transferred to a dye bath. The dye bath consists of one gram per liter of Aluminum Bordeaux RL. The dye solution is maintained at 145° F. Absorption of the dye requires about 10 minutes, after which a thorough rinsing in cold water follows. Finally the oxide is "sealed" in a clean water bath maintained at 200° F for 20 minutes. After subsequent drying the foil is spooled onto a convenient reel to be used for winding of the coil itself.

The foil is wound onto a fixture of proper form and having side flanges to locate the foil during the winding process. The exposed surfaces of the winding form are covered with Teflon tape of about 6 micrometers thickness. The side flanges of the fixture are removable.

During the winding process the foil is wetted with a special epoxy cement mixture. The epoxy used is that which is known commercially as Span 815. The epoxy cement is prepared by mixing the resin with catalyst and adding about 25 percent by volume of fine alumina powder approximately 1 micrometer in size. Before applying the epoxy preparation it is evacuated in order to remove trapped air bubbles from within the resin. The addition of the alumina adds to the strength of the epoxy, proves additional insulation between layers, and enhances the determination of the spacing between layers.

Before the winding is started, the beginning end of the foil is stripped of oxide layer by immersion in sodium hydroxide solution. A length of about 5 mm is thus stripped. This clean metallic surface is spot welded to one of a pair of special end pieces 38, 39 held in the winding fixture which eventually will provide the electrical connection to the flexure pivots for the coil. The coil is wound on the jig while continuously wetting the inner foil surface until 35 turns have been built up.

After the coil is wound, the foil is cut and the end is left loose. Then the coil is transferred to a curing jig. The curing jig is made with inner and outer segments, such that it will form a transverse radius on the longitudinal sections of the coil. The jig is treated with release compound so that the epoxy cement will not adhere to the jib itself. The mirror is added to the jig and the coil pressed into its final form.

The curing jig is transferred to an oven where it is held at 100° C for the first 3 hours, then raised to 200° C for another 2 hours. After cooling the coil is removed from the curing jig. Any cement excess and foreign material are removed.

The loose end of the coil is cut to a suitable length and the oxide stripped, as described above. The clean end is again spot welded to another tab which is to provide the electrical connection to one of the end pieces 38, 39 at the other end of the coil.

Electrical testing of the coil 12 is performed to ensure that there are not shorted turns. In these tests the DC resistance should range between 1.5 and 2.0 ohms. The inductance should be very nearly 120 mH.

I claim:

1. An electromechanical deflector for deflecting a light beam, operating in a ballistic mode and including means for generating a magnetic field, comprising the combination of;

galvanometer coil means including an annular coil of thin rectangular cross section and selected width disposed within the magnetic field;

mirror means integrally secured and supported within the coil to receive and reflect the light beam through a selected sweep;

wherein the selected width of the coil means and mirror means assembly configuration maximizes the inductance/inertia resonance $f_2$ and the coil/mirror inertia torsional resonance $f_3$ thereof to maximize the range of the ballistic mode of operation;

flexure pivot means disposed at either end of the coil means to pivotally support the latter within the magnetic field, the flexure pivot means providing electrically conductive connections; and driver circuit means electrically coupled to the flexure pivot means and thus the coil for introducing thereto a current pulse doublet of a form commensurate with the desired mirror acceleration, said mirror acceleration increasing during the first portion, and decreasing during the last portion of the sweep without application of external damping thereto.

2. The deflector of claim 1 wherein said mirror means is rigidly bonded within the central portion of the coil; wherein the means for generating a magnetic field includes yoke means integral therewith for supporting said flexure pivot means, and flux keepers formed of magnetic material and secured by said yoke means within respective outer coil driving portions of the coil to concentrate the flux in said coil driving portions.

3. The deflector of claim 1 wherein the coil means dimensions are selected to maximize the resonances $f_2$, $f_3$ of the formulas $$f_2 = B/2\pi c \quad \sqrt{(K/\pi P_w P Q)} \ (2a/l) \ (c/g)$$

and $$f_3 = 2c/\pi l^2 \quad \sqrt{E/P_w R}$$

wherein $B$ = gap flux density; $c$ = coil width; $K$, $P$, $Q$ and $R$ are constants; $P_w$ = density of the winding; $a$ = width of the coil driving section; $l$ = total length of the coil; $g$ = width of the pole surface; $E$ = Young's modulus of the coil material.

4. The deflector of claim 3 wherein the coil mean defines a continuously wrapped multiple layer of a thin conductive material, wherein the width of the material is selected to provide substantially equal frequencies for the resonances $f_2$ and $f_3$.

5. The deflector of claim 4 wherein the normal bean deflection is of the order of from 10° to 12°, the coil width c is of the order of 2 to 3 millimeters, and the mirror width is of the order of 8 to 12 millimeters, the inductance/inertia resonance is at a frequency of the order of from 800 to 1,500 Hertz, and the coil/mirror inertia torsional resonance is of the order of from 4,000 to 5,000 Hertz.

* * * * *